(12) United States Patent
Buchheit

(10) Patent No.: US 7,886,011 B2
(45) Date of Patent: Feb. 8, 2011

(54) DYNAMIC SET OPERATIONS WHEN SPECIFYING EMAIL RECIPIENTS

(76) Inventor: Brian K. Buchheit, 15521 SW. 49th St., Davie, FL (US) 33331

( * ) Notice: Subject to any disclaimer, the term of this patent is extended or adjusted under 35 U.S.C. 154(b) by 682 days.

(21) Appl. No.: 11/380,984

(22) Filed: May 1, 2006

(65) Prior Publication Data

US 2007/0255789 A1 Nov. 1, 2007

(51) Int. Cl.
G06F 15/16 (2006.01)
(52) U.S. Cl. .......................... 709/206; 709/207
(58) Field of Classification Search ......... 709/204–207, 709/225, 229; 715/752
See application file for complete search history.

(56) References Cited

U.S. PATENT DOCUMENTS

| | | | | |
|---|---|---|---|---|
| 5,787,411 A * | 7/1998 | Groff et al. | ............. | 707/2 |
| 5,805,811 A * | 9/1998 | Pratt et al. | ............. | 709/206 |
| 5,923,848 A * | 7/1999 | Goodhand et al. | ....... | 709/219 |
| 5,963,938 A * | 10/1999 | Wilson et al. | ............ | 707/4 |
| 6,192,396 B1 * | 2/2001 | Kohler | ............. | 709/206 |
| 6,247,043 B1 * | 6/2001 | Bates et al. | ............. | 709/200 |
| 6,529,942 B1 * | 3/2003 | Gilbert | ............. | 709/206 |
| 6,721,785 B1 * | 4/2004 | Raghunandan | ......... | 709/206 |
| 6,993,563 B2 * | 1/2006 | Lytle et al. | ............. | 709/206 |
| 2003/0061289 A1 * | 3/2003 | Clissold et al. | ....... | 709/206 |
| 2004/0093382 A1 * | 5/2004 | Kulkarni | ............. | 709/206 |
| 2005/0117715 A1 * | 6/2005 | Bordia | ............. | 379/88.13 |
| 2006/0080393 A1 * | 4/2006 | Cardone et al. | ....... | 709/206 |
| 2008/0183822 A1 * | 7/2008 | Cai et al. | ............. | 709/206 |
| 2008/0201433 A1 * | 8/2008 | McDonald | ............. | 709/206 |
| 2009/0094244 A1 * | 4/2009 | Hamilton et al. | ....... | 707/9 |
| 2009/0106370 A1 * | 4/2009 | Dreyfus et al. | ....... | 709/206 |
| 2009/0113446 A1 * | 4/2009 | Hamilton et al. | ....... | 719/314 |
| 2009/0132490 A1 * | 5/2009 | Okraglik | ............. | 707/3 |
| 2009/0182820 A1 * | 7/2009 | Hamilton et al. | ....... | 709/206 |
| 2010/0057730 A1 * | 3/2010 | Gao et al. | ............. | 707/5 |

\* cited by examiner

*Primary Examiner*—Faruk Hamza
(74) *Attorney, Agent, or Firm*—Brian K. Buchheit; Patents on Demand, P.A.

(57) ABSTRACT

A method for specifying email recipients that includes specifying a first set of email recipients, a second set of email recipients, and a set operation. A third set of email recipients can be automatically is generated by performing the set operation upon the first set and the second set. Email can then be sent to this automatically generated third set of email recipients.

17 Claims, 4 Drawing Sheets

DYNAMIC SET OPERATIONS WHEN SPECIFYING EMAIL RECIPIENTS

BACKGROUND

1. Field of the Invention

The present invention relates to the field of email and, more particularly, to the performance of dynamic set operations when specifying email recipients.

2. Description of the Related Art

Email plays a large part in personal and business communications. When sending an email to a large number of recipients, users must enter an identifier for each addressee and/or specify a distribution list containing a static group of previously defined addressees. Large groups of addressees and/or distribution lists can be difficult to manage. Many email applications have the ability to categorize addressees and distribution lists. This ability allows users to organize addressees and distribution lists into user defined recipient groups, such as "Family" or "Coworkers". When graphically selecting recipient groups, users can choose to view only those recipients and distribution lists associated with a defined group.

Despite conventional organizational aids, email applications that support conventional distribution lists lock users into an all-or-nothing arrangement. The applications do not allow a user to send an email to a subset of addressees in a distribution list, such as excluding a specific email address from the list. Instead, users must resort to manually editing the distribution list members or manually selecting individual email addresses. This limitation can be tedious and frustrating to users who desire to send email to a large set of recipients that is similar but not identical to a set of addressees specified within an existing distribution list.

Another problem with many existing implementations of distribution lists is that users cannot combine multiple distribution lists to create a single list that includes all members without a duplication of email addresses. Users can select multiple distribution lists as recipients. However, if an email address appears in multiple lists, this recipient can be sent the email message multiple times. This amount of extraneous email can be taxing on the receiver's email system by consuming more space than necessary. In turn, these extraneous emails can cause the receiver's email inbox to reach capacity faster and, therefore, reject other pertinent messages.

To cope with these shortcomings, many users create a multiplicity of distribution lists with minor differences in an attempt to overcome the inherent static nature of conventional distribution lists. The quantity of modified distribution lists necessary to account for even the most probable permutations is astronomical and increases exponentially as the size and quantity of lists increase. These lists can consume additional storage space, which can degrade the overall performance of the email system. Additionally, the user is challenged with having to constantly decipher somewhat cryptic names often assigned to a plethora of similar distribution lists.

SUMMARY OF THE INVENTION

The present invention permits users of email applications to modify existing email distribution lists through the use of set operations. More specifically, this invention permits a user to specify a first set of email recipients, a second set of email recipients, and a set operation. A third set of email recipients can be automatically generated by performing the set operation upon the first set and the second set. An email message can then be sent to each recipient in the third set. It should be understood that the present invention can combine any number of sets to generate a resultant set and is not to be construed as limited to embodiments where two sets are combined to generate a third set.

The present invention can be implemented in accordance with numerous aspects consistent with the material presented herein. For example, one aspect of the present invention can include a software method for specifying email recipients that includes a graphical user interface that is associated with an email application. Within the graphical user interface, a user specified distribution list, a user specified set operation, and one or more user specified email recipients can be identified. Software algorithms can automatically generate a set of intended email recipients by performing the set operation upon the distribution list and the at least one email recipient.

Another aspect of the present invention can include a graphical user interface (GUI) for sending email. The GUI can include a recipient designation section and a set operation designation section. A set of intended email recipients can be automatically generated by a software program that performs a set operation specified in the set operation designation section against at least two sets of recipients specified in the recipient designation section.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
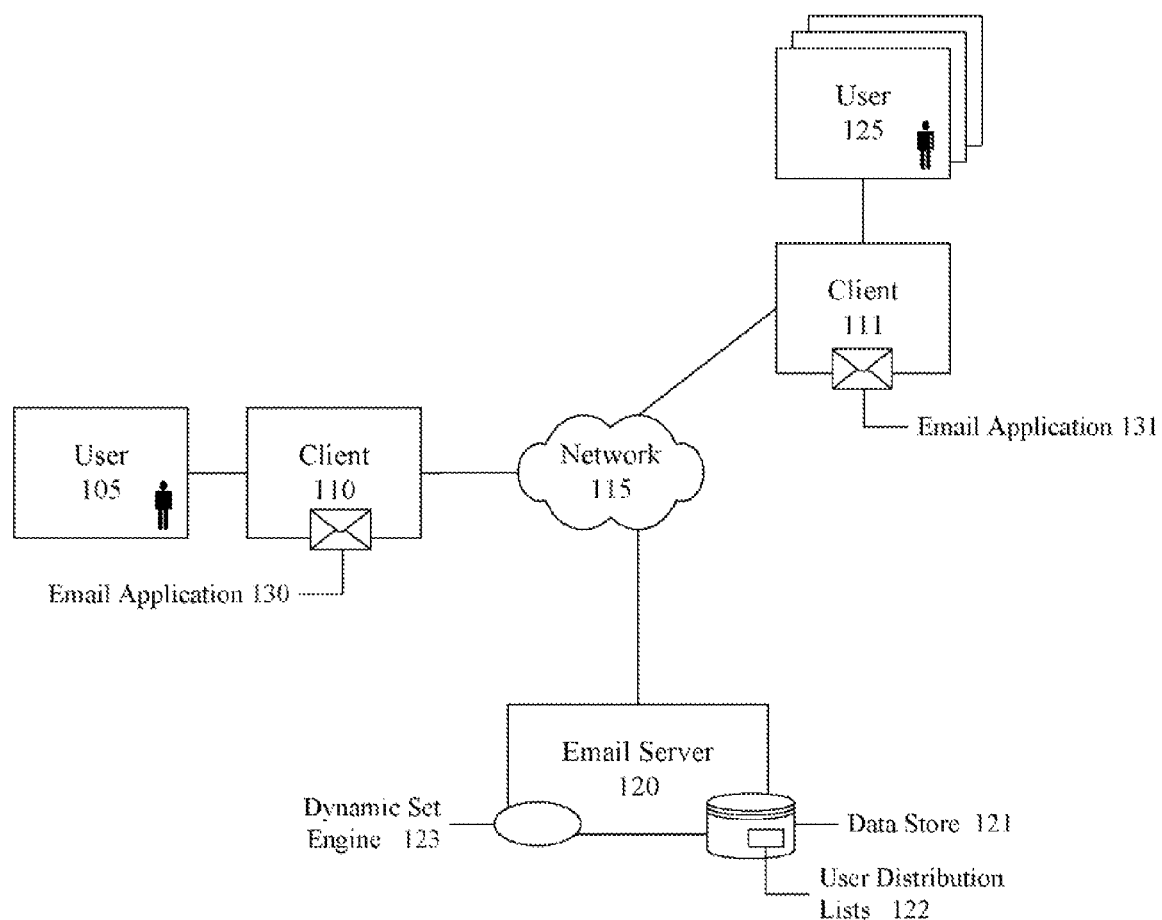
FIG. 1 is a schematic diagram of a system for sending electronic mail in accordance with an embodiment of the inventive arrangements disclosed herein.

FIG. 1 is a schematic diagram of a system 100 for sending electronic mail in accordance with an embodiment of the inventive arrangements disclosed herein. In system 100, user 105 can send an email via email application 130 running on client 110. Email application 130 can be any of a variety of email system interfaces including, but not limited to, a software client, a Web page, a thin client, an applet, and the like. Client 110 can be any of a variety of computing devices including, but not limited to, a personal computer, a kiosk, a personal data assistant (PDA), a mobile phone, and the like.

Client 110 can operate in a stand-alone fashion. Alternatively, client 110 can be a device that cooperatively participates in a network of distributed computing devices. Network 115 can facilitate data exchanges over wireless as well as line-based communication pathways and protocols.

Email application 130 communicates with email server 120 via client 110 and network 115. Email server 120 includes data store 121, which contains user distribution lists 122, and dynamic set engine 123. User distribution lists 122 can include one or more previously defined addressees. User 105 can access user distribution lists 122 for use in email application 130.

Dynamic set engine 123 can include a set of machine-readable instructions for performing dynamic set operations upon user selected recipients and/or previously established distribution lists. Dynamic set engine 123 can be implemented in a variety of manners including, but not limited to, a web service, a server application, a client application, an email server application plug-in component, and the like. Dynamic set engine 123 can receive data from email application 130 and/or data store 121 via network 115. Results from the processing of data can be displayed in email application 130 and stored in data store 121, expanding the contents of user distribution lists 122. In another embodiment, dynamic set engine 123 can reside on client 110.

User 125 can access an email via email application 131 running on client 111. Email application 131 can be any of a variety of email system interfaces including, but not limited to, a software client, a Web page, a thin client, an applet, and the like. Client 111 can be any of a variety of computing devices including, but not limited to a personal computer, a kiosk, a personal data assistant (PDA), a mobile phone, and the like. Client 111 can operate in a stand-alone fashion. Alternatively, client 110 can be a device that cooperatively participates in a network of distributed computing devices.

Figure 2:
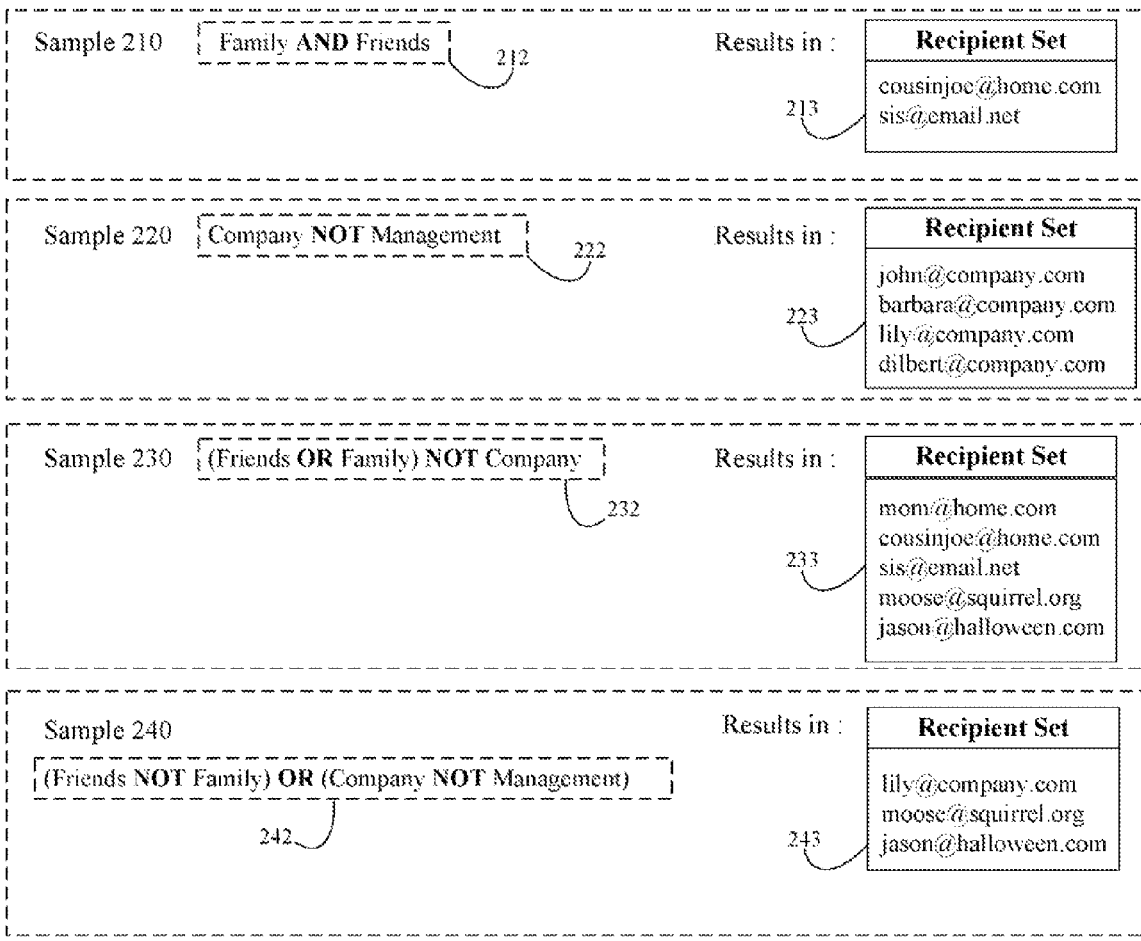
FIG. 2 illustrates a collection of sample user distribution lists and sample operations on the sample user distribution lists.

FIG. 2 illustrates a collection 200 of sample user distribution lists and sample operations on the sample user distribution lists. For illustrative purposes, four distribution lists, Family 201, Friends 202, Company 203, and Management 204, are defined with fictitious email addresses. Family 201 can include email addresses such as mom@home.com, sis@email.net, and cousinjoe@home.com. Friends 202 can include email addresses such as lily@company.com, amy@company.com, cousinjoe@home.com, sis@email.net, moose@squirrel.org, and jason@halloween.com. Company 203 can include email addresses such as john@company.com, barabara@company.com, any@company.com, steve@company.com, lily@company.com, and dilbert@company.com. Management 204 can include email addresses such as amy@company.com, catbert@hr.net, and steve@company.com.

Sample 210 includes recipient definition 212 and recipient set 213. Recipient set 213 is generated by performing the set operation in recipient definition 212. In this example, recipient set 213 contains those email addresses that exist in both Family 201 and Friends 202.

Sample 220 includes recipient definition 222 and recipient set 223. Recipient set 223 is generated by performing the set operation in recipient definition 222. In this example, recipient set 223 contains those email addresses that exist in Company 203 that are not a member of Management 204.

Sample 230 includes recipient definition 232 and recipient set 233. Recipient set 233 is generated by performing the set operations in recipient definition 232. Order of operation preference is designated by the use of parentheses in recipient definition 232. In this example, recipient set 233 contains those email addresses that exist in either Family 201 or Friends 202, but not in Company 203.

Sample 240 includes recipient definition 242 and recipient set 243. Recipient set 243 is generated by performing the set operations in recipient definition 242. Order of operation preference is designated by the use of parentheses in recipient definition 242. In this example, recipient set 243 contains those email addresses that exist in Friends 202 but not Family 201, or Company 203 but not Management 204.

Figure 3:
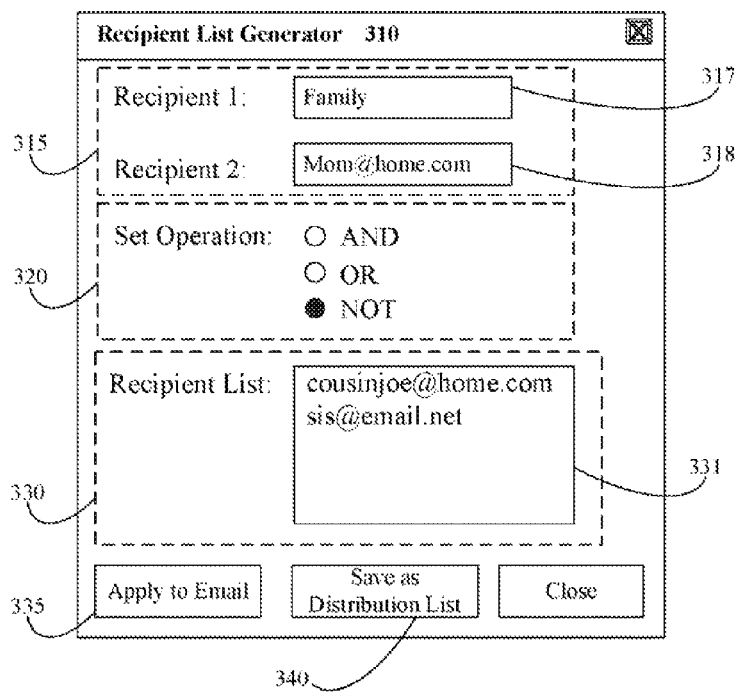
FIG. 3 illustrates a collection of graphical user interfaces (GUIs) for a system that supports dynamic set operations when specifying email recipients in accordance with an embodiment of the inventive arrangements disclosed herein.
Figure 3:
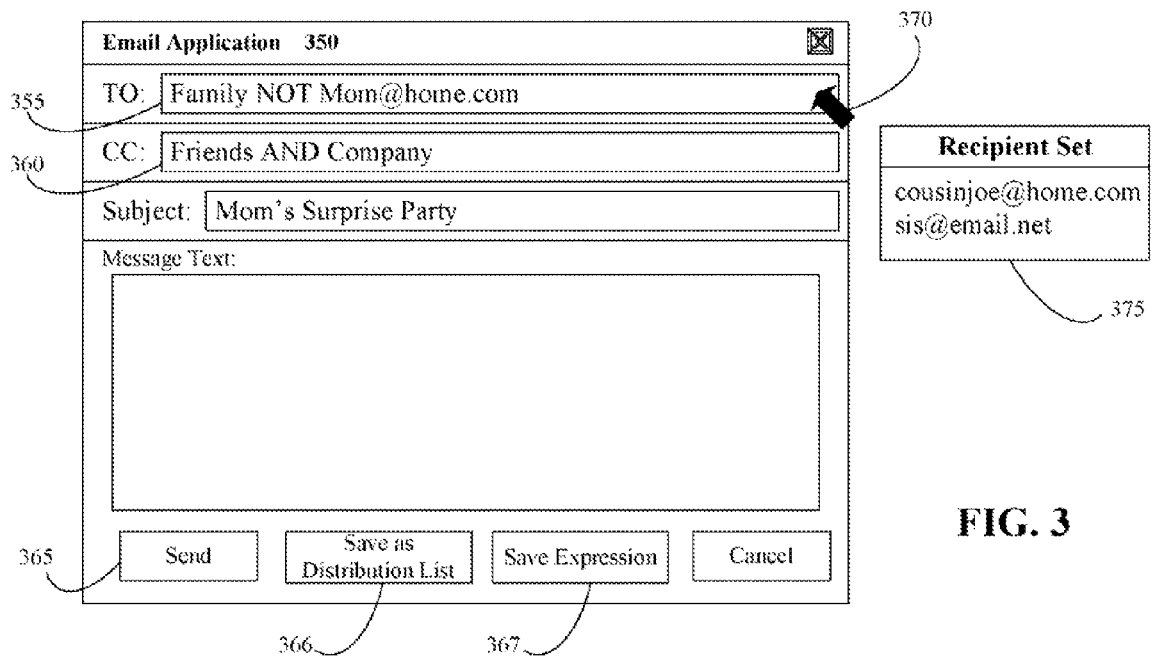

FIG. 3 illustrates a collection 300 of graphical user interfaces (GUIs) for a system that supports dynamic set operations when specifying email recipients in accordance with an embodiment of the inventive arrangements disclosed herein. Recipient list generator GUI 310 can be an external interface to email application 130 of system 100 and can reside on either client 110 or email server 120. Additionally, recipient list generator GUI 310 can utilize the sample user distribution lists of collection 200.

recipient list generator GUI 310 can include recipient designation section 315, set operation designation section 320, resultant recipient section 330, apply button 335, and save button 340. Recipient designation section 315 can include first set designator 317 and second set designator 318. A user of recipient list generator GUI 310 can specify an email address or a previously established email distribution list in first set designator 317 and second set designator 318. Designation of an email address or previously established email distribution list in first set designator 317 or second set designator 318 can be performed in any of a variety of mechanisms including, but not limited to, input by a user via a keyboard, selection by an user from a drop-down list, a copy-and-paste function performed by a user, selection by an user from a pop-up menu, and the like.

Set operation designation section 320 can contain a graphical display of user selectable set operations. Set operation designation section 320 can be any of a variety of selection mechanisms including, but not limited to, radio buttons, a drop-down list, a pop-up menu, a combo box, and the like.

Resultant recipient section 330 can include resultant recipient set 331. Resultant recipient set 331 displays the results of the operation selected in set operation designation section 320 upon the first set designator 317 and second set designator 318 of the recipient designation section 315. Resultant recipient section 330 can be any of a variety of display methods including, but not limited to, a pop-up window, a fly-over window, a GUI display window, an applet, and the like. Modifications to the contents of resultant recipient set 331 can be made by a user via a mechanism such as a right-click pop-up menu or typing.

Selection of apply button 335 by a user transmits the contents of resultant recipient set 331 to email application 130 of system 100. Selection of save button 340 by a user stores the contents of resultant recipient set 331 in data store 121 of email server 120 of system 100.

Email application GUI 350 can be an interface of email application 130 of system 100 and can reside on either client 110 or email server 120. Additionally, email application GUI 350 can utilize the sample user distribution lists of collection 200.

Email application GUI 350 can include primary recipient designation 355, copy recipient designation 360, a blind copy recipient designation (not shown), and the like. Primary recipient definition 355 and copy recipient definition 360 can accept user input of email addresses, previously established distribution lists, and set operations. Primary recipient definition 355 and copy recipient definition 360 can accept any of a variety of input methods including, but not limited to, a cut-and-paste function, a keyboard, a point-and-click function, a drop-down list, and the like.

Cursor 370 can represent a graphical pointer associated with a computing device. The placement of cursor 370 over primary recipient definition 355 by a user results in the appearance of recipient set window 375. Recipient set window 375 can be a display for the results of the set operation defined in primary recipient definition 355. Recipient set window 375 can be any of a variety of display methods including, but not limited to, a pop-up window, a flyover pop-up window, an application window, and the like.

The selection of send button 365 by a user results in the dispatching of the email to the email addresses designated by primary recipient definition 355 and copy recipient definition 360. The selection of the save list button 366 by a user stores the contents of recipient set 375 which contains the list as defined by primary recipient definition 355, copy recipient definition 360, or both in data store 121 of email server 120 of system 100. The selection of save expression button 367 stores the contents of either primary recipient definition 355 or copy recipient definition 360 or both for future reuse.

It should be appreciated that interfaces 310 and 350 are provided to demonstrate concepts described for an embodiment of the inventive arrangements disclosed herein. Interfaces 310 and 350 are not intended to constrain the scope of the invention to a particular contemplated expression. Derivatives of interfaces 310 and 350 including different interface elements, arrangements, layouts, and the like are contemplated herein. Further, although examples shown in interfaces 310 and 350 illustrate two sets being combined to generate a third recipient set, the invention is not to be limited in this regard. That is, any number of recipient sets or distribution lists can be combined to generate a resultant recipient set or dynamic distribution list.

Figure 4:
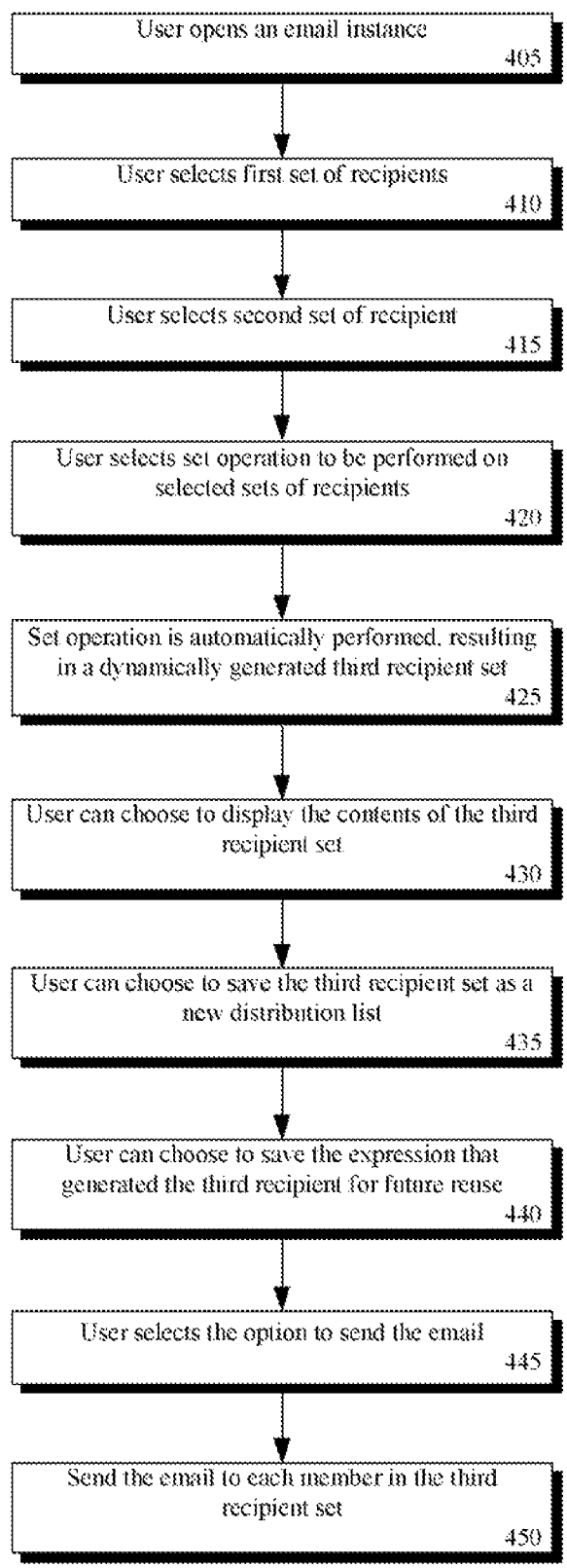
FIG. 4 is a flow chart of a method for the use of dynamic set operations when specifying email recipients in accordance with an embodiment of the inventive arrangements disclosed herein.

FIG. 4 is a flow chart of a method 400 for the use of set operations when specifying email recipients in accordance with an embodiment of the inventive arrangements disclosed herein. Method 400 can be performed in the context of system 100 or in the context of any other system allowing the composition and sending of email. Additionally, method 400 can be performed in the context of recipient list generator GUI 310 or email application GUI 350 or in the context of any other GUI that supports the performing of set operations on recipient lists.

Method 400 can begin in step 405, where a user opens an email instance. In step 410, a user selects their first set of recipients. The first set of recipients can be any of a variety of email addressee representations including, but not limited to, a single email address, a name of a previously established distribution list of email addresses, an identifier that is associated with an email address, and the like. A second distribution list is selected in step 415. The second set of recipients can be any of a variety of email addressee representations including, but not limited to, a single email address, a name of a previously established distribution list of email addresses, an identifier that is associated with an email address, and the like.

In step 420, a set operations selected by a user that is to be performed upon the sets of recipients selected in steps 410 and 415. Step 425 is the performance of the set operation designated in step 420 upon the sets of recipients identified in steps 410 and 415, resulting in a dynamically generated third recipient set. A user can choose to display the contents of the third recipient set graphically in step 430. The contents of the third recipient set can be displayed in any of a variety of methods including, but not limited to, a pop-up window, a flyover pop-up window, an application window, a text box, and the like. In step 435, a user can choose to save the contents of the third recipient set for future reuse as an established distribution list in data store 121 of email server 120 of system 100. The expression used to generate the third recipient set can be saved by a user for future reuse in step 440. In step 445, a user selects the option to send the email. Step 450 sends the email to each member of the third recipient set.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language code or notation, of a set of instructions intended to cause a system having an information processing capability to perform a particular function either directly or after either or both of the following: a) conversion to another language, code or notation; b) reproduction in a different material form.

What is claimed is:

1. A method for specifying email recipients comprising:

specifying, via computing equipment executing at least one program that is stored in a non-transitory storage medium, a first set of email recipients within one designation section of a plurality of different email designation sections of a graphical user interface, wherein said email designation sections comprise a TO section and a CC section;

designating, via the computing equipment executing at least one program that is stored in the non-transitory storage medium, a user specified set operation, wherein the user specified set operation is typed as text into the one designation section, and wherein the user has an option to specify a Boolean operation as the user specified set operation, wherein said Boolean operation comprises at least one of an exclusion operation and an intersection operation;

specifying, via the computing equipment executing at least one program that is stored in the non-transitory storage medium, a second set of email recipients, wherein at least one of the first set and the second set comprise a previously established email distribution list; and automatically generating, via the computing equipment executing at least one program that is stored in the non-transitory storage medium, a third set of email recipients by performing the user specified set operation upon the first set of email recipients and the second set of email recipients, wherein the third set of email recipients includes fewer recipients than the first set, wherein the third set defines email recipients for the one designation section, wherein other ones of the different email designation sections are unaffected by the user specified set operation and by the second set, wherein when the set operation is the exclusion operation the third set consists of recipients in the first set that are not in the second set, and wherein when the set operation is the intersection operation the third set consists of recipients that exist in both the first set and the second set.

2. The method of claim 1, wherein the user specified set operation, the first set, and the second set are typed as text into the one designation section.

3. The method of claim 1, wherein the set operation is the exclusion operation that is typed in the one designated section as "NOT".

4. The method of claim 1, wherein the set operation is the intersection operation that is typed in the one designated section as "AND".

5. The method of claim 1, further comprising:
presenting, via computing equipment executing at least one program that is stored in the non-transitory storage medium, an option to save the third set as a new distribution list, wherein a new distribution list comprising the recipients of the third set is created upon a user selection of the option.

6. The method of claim 1, further comprising:
within the graphical user interface, presenting, via computing equipment executing at least one program that is stored in the non-transitory storage medium, each email recipient in the third set, wherein at least one of the first set and the second set is a distribution list so that recipients of that distribution list are not displayed within the graphical user interface when the email recipients of the third set are displayed.

7. The method of claim 1, wherein the graphical user interface comprises a user selectable programmatic action for storing an expression from which the third set was generated for future reuse, wherein said expression comprises the first set, the second set, and the user specified set operator.

8. The method of claim 1, wherein the user who specified the user specified set operation has an option to specify any of the following Boolean operation as the user specified set operation: exclusion operation, union operation, complementation operation, and intersection operation.

9. The method of claim 1, wherein the method evaluates a Boolean expression including at least two Boolean operations to generate the third set, where an order of operations for the Boolean expression is determined by user specified parenthesis placed within the Boolean expression, wherein the user specified parenthesis and the at least two Boolean operations are specified as text within the one designation section.

10. The method of claim 1, wherein a user specifies the first set of recipients followed by the user specified set operation, followed by the second set via a single line of text input into the graphical user interface.

11. A computer implemented method for specifying email recipients comprising:
providing a graphical user interface on a display associated with an email application executed by a computing system, wherein the graphical user interface comprises a plurality of different email designation sections of the graphical user interface, wherein said email designation sections comprise a TO section and a CC section;
identifying within one section of the different email designation sections a user specified distribution list input as text, a user specified set operation input as texts, and a user specified at least one email recipient input as text, wherein a user has an option to specify a Boolean operation as the user specified set operation, wherein said Boolean operation comprises at least one of an exclusion operation and an intersection operation; and
automatically generating a set of intended email recipients for the one section of the different email designation sections by performing the user specified set operation upon the user specified distribution list and the at least one email recipient, wherein the set of intended email recipients comprises fewer recipients that those contained in the user specified distribution list, wherein when the set operation is the exclusion operation the set of intended email recipients consists of recipients in the user specified distribution list that are not in the at least one email recipient input, and wherein when the set operation is the intersection operation the set of intended email recipients consists of recipients that exist in both the user specified distribution list and the at least one email recipient.

12. A computer program product stored in a non-transitory storage medium comprising a set of computer usable instructions that when executed by a processor produce a graphical user interface interactively presented upon a computing device, said graphical user interface comprising:
a plurality of different email designation sections of the graphical user interface, wherein said email designation sections comprise a TO section and a CC section, wherein each of the different email designation sections permit a user to textually enter a first set of email recipients, a set operation, and a second set of email recipients; and
a send option to send identical copies of an email message to recipients designed in the different email designation sections, wherein a selection of the send option causes a computing program executing on computing equipment to determine a set of recipients that are to receive the email message for each of the different email designation sections, wherein the determination of the set of recipients for each of the different email designation sections is independent of determinations made for other ones of the different email designation sections, wherein said computing program, for each of the designation sections comprising the first set, the second set, and the set operation, wherein the set operation is a user specified set operation and wherein a user has an option to specify a Boolean operation as the user specified set operation, wherein said Boolean operation comprises at least one of an exclusion operation and an intersection operation:
generates a third set which includes the recipients that are to receive the email message for that designated section, wherein the third set is determined by performing the set operation against the first set and the second set, which situationally results in the third set having fewer recipients than the first set, wherein the graphical user interface is generated by a program stored in a non-transitory medium that is executed upon computing equipment, wherein when the set operation is the exclusion operation the third set consists of recipients in the first set that are not in the second set, and wherein when the set operation is the intersection operation the third set consists of recipients that exist in both the first set and the second set.

13. The computer program product of claim 12, wherein at least one previously established email distribution list is able to be designated within the a plurality of different email designation sections as either the first set or the section set.

14. The computer program product of claim 12, the graphical user interface further comprising:
 a resultant recipient section within which recipients of the third set is displayed.

15. The computer program product of claim 14, further comprising:
 an ability for the user of the graphical user interface to add and remove recipients from the third set, before the email message is sent.

16. The computer program product of claim 12, wherein the graphical user interface comprises a user selectable programmatic action for storing a new distribution list consisting of the third set of recipients.

17. The computer program product of claim 12 wherein the user of the graphical user interface has an option to specify any of the following Boolean operation as one of the set operations: exclusion operation, union operation, complementation operation, and intersection operation.

* * * * *